United States Patent [19]
Clopton

[11] Patent Number: 5,489,020
[45] Date of Patent: Feb. 6, 1996

[54] SMOOTH-DRIVING CONVEYOR CHAIN

[75] Inventor: Robert T. Clopton, Magnolia, Ky.

[73] Assignee: Tekno, Inc., Cave City, Ky.

[21] Appl. No.: 255,408

[22] Filed: Jun. 8, 1994

[51] Int. Cl.[6] .................................................. B65G 17/06
[52] U.S. Cl. ............................................ 198/851; 198/853
[58] Field of Search ................................. 198/850, 851, 198/852, 853

[56] References Cited

U.S. PATENT DOCUMENTS

| D. 202,814 | 11/1965 | Hall . |
| D. 231,633 | 5/1974 | Totani . |
| D. 284,640 | 7/1986 | Schroeder et al. . |
| D. 292,065 | 9/1987 | Abbestam et al. . |
| 1,136,578 | 4/1915 | Ayres . |
| 2,268,542 | 1/1942 | Bergmann . |
| 2,360,057 | 10/1944 | Klaiber et al. . |
| 2,443,947 | 6/1948 | Brooks et al. . |
| 2,602,345 | 7/1952 | Braumiller . |
| 3,209,897 | 10/1965 | Rice . |
| 3,646,752 | 3/1972 | Kampfer . |
| 3,742,863 | 7/1973 | Rosenberger, Jr. ................ 198/851 X |
| 3,788,455 | 1/1974 | Dieckmann, Jr. . |
| 4,418,817 | 12/1983 | Martin et al. ..................... 198/851 X |
| 4,645,070 | 2/1987 | Homeier . |
| 4,951,457 | 8/1990 | Deal . |
| 5,307,923 | 5/1994 | Damkjaer ........................... 198/853 X |
| 5,402,880 | 4/1995 | Murphy ................................... 198/852 |
| 5,404,997 | 4/1995 | Schreier et al. ................... 198/852 X |

FOREIGN PATENT DOCUMENTS

| 0569072 | 11/1993 | European Pat. Off. ............... 198/852 |
| 1286155 | 8/1972 | United Kingdom .................. 198/853 |

Primary Examiner—James R. Bidwell
Attorney, Agent, or Firm—Camoriano & Smith

[57] ABSTRACT

A conveyor chain is made up of carrier links and connector links, and the carrier links provide forward and rear drive surfaces, so as to provide a smooth drive.

10 Claims, 7 Drawing Sheets

SMOOTH-DRIVING CONVEYOR CHAIN

BACKGROUND OF THE INVENTION

The present invention relates to conveyor chains. Many different types of conveyor chains are known in the art. These chains generally have a flat top surface for carrying products, and each link of the chain provides a surface against which a sprocket tooth can push for driving the chain.

One of the problems of prior art conveyor chains is that, if the chain links are made long enough to provide a substantial conveying surface and to minimize the number of parts (and therefore the cost of the chain), then there is a cordal effect when the chain is driven, making the chain move with a jerky, pulsing motion and creating noise. If the length of the links is reduced in order to reduce the cordal effect, then the conveying surfaces become very short, and the cost of the chain goes up substantially, due to the cost of assembling many more parts.

Another problem of prior art plastic conveyor chains is that they tend to break. The part which receives the chain pin often is not very well-supported by the rest of the link, which permits the plastic to flex and break.

Another problem of prior art plastic conveyor chains is that they tend to stretch. Since the chain generally needs to be taut in order to function properly, stretching of the chain can cause problems. For example, the excess chain tends to wedge itself in the track or in the guards at the drive end, causing jamming and malfunctioning of the conveyor.

Prior art chain also generally has no way to drive the chain from the side in addition to the bottom drive.

Prior art chain, when going around horizontal corners, generally has only a single point of contact with the wear strip or wheel, so that forces become concentrated at that point of contact.

SUMMARY OF THE INVENTION

The present invention provides a conveyor chain which overcomes many of the problems of the prior art.

The present invention provides a conveyor chain in which, instead of the sprocket contacting each link at one point, the chain of the present invention provides forward and rear drive surfaces on each carrier link, so the sprocket drives each carrier link at a forward point and a rear point. This reduces the cordal effect, including jerkiness, pulsations, and noise without reducing the length of the conveying surface or increasing the number of parts and makes it possible to reduce the size of the drive sprocket, allowing it to operate in small spaces.

The chain of the present invention provides for good distribution of forces in the link, so the link has good tensile strength and has much less tendency to flex when being driven than prior art chains.

The chain of the present invention also provides a design in which stretching is greatly reduced, so as to reduce the problems caused by stretching. In addition, the chain of the present invention permits the links to collapse on each other in a controlled fashion in the event of stretching, so that jamming problems do not occur.

The chain of the present invention, by providing two pivot points per link, allows each link to lie flat against a wear strip or wheel when turning horizontal corners, so there are at least two points of contact between the chain and the wear strip or wheel. This provides good contact between the link and the wear strip or wheel, thereby spreading the forces out over a larger surface area than in the prior art.

The chain of the present invention can also be driven from the bottom or from the side.

DESCRIPTION OF THE PREFERRED EMBODIMENTS

Figure 1:
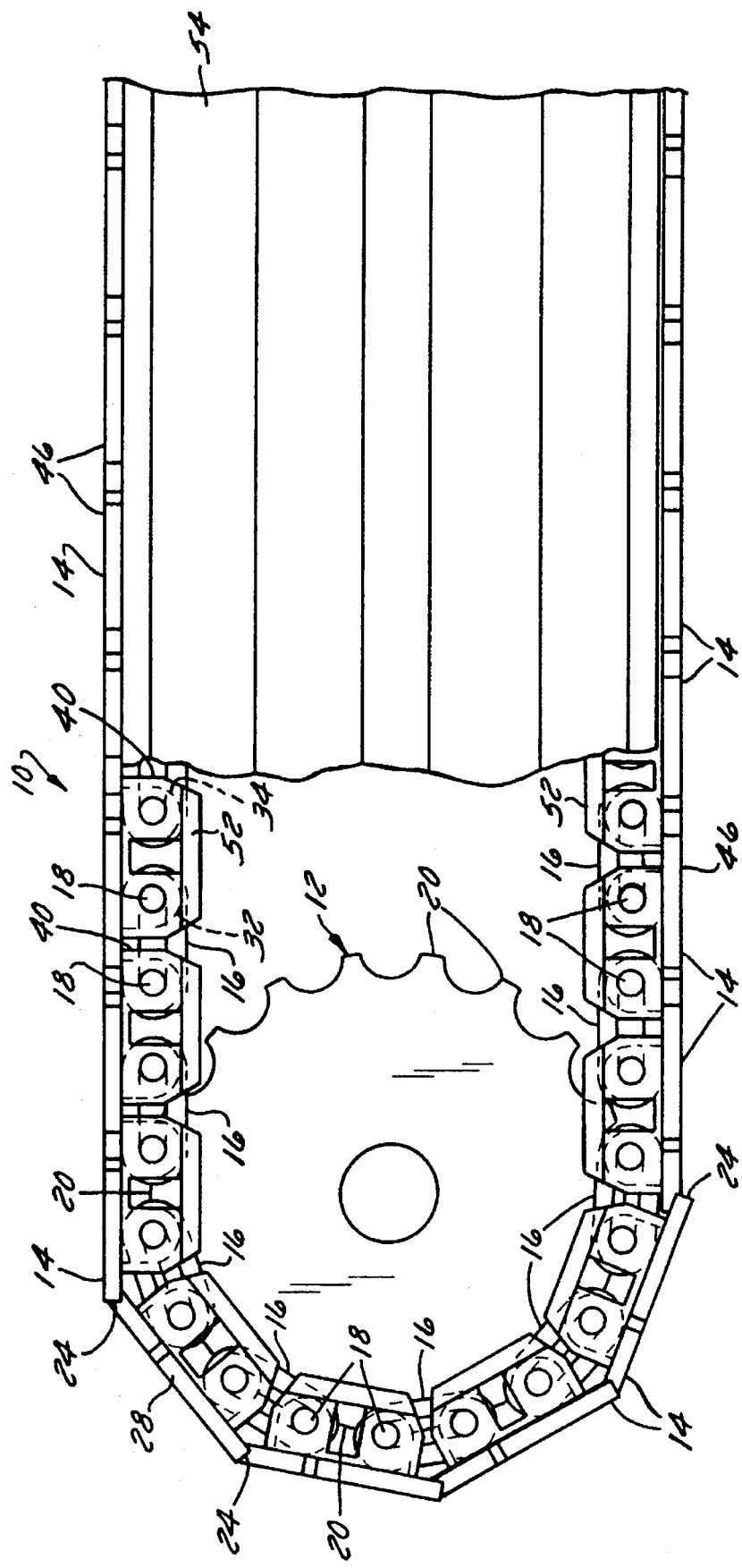
FIG. 1 is a side view of a conveyor using the chain of the present invention, with part of the conveyor frame broken away to show the chain and drive sprocket clearly.

FIGS. 1–6 show a first embodiment of the chain of the present invention. FIG. 1 shows a side view of the chain 10 being driven from below by a sprocket 12. The chain 10 is made up of carrier links 14 and connector links 16, which are connected together by pins 18. It should be noted that there are forward and rear drive points on each carrier link 14, so that, as the sprocket 12 rotates, it first contacts the forward drive points and then the rear drive points on the carrier link 14. This provides a much smoother drive than in prior art chains, in which the sprocket contacts each link at only one radial position.

Each carrier link 14 has a link body 22, which defines a forward edge 24, a rear edge 26, a left side 28, and a right side 30, which can be seen in FIGS. 3–6. The carrier link 14 also has an aligned pair of forward knuckles 32 and an aligned pair of rear knuckles 34. There is a space 36 between each pair of knuckles, and that space 36 receives the respective connector link 16. Each connector link 16 receives two pins 18. The forward pin 18 passes through the rear knuckles 34 of one carrier link 14, and the rear pin 18 passes through the forward knuckles 32 of the next carrier link 14.

Each knuckle 32, 34 is supported by inner and outer plates 38, 40, which are integral with the link body 22 and which, therefore, distribute the forces from the knuckles 32, 34 into the link body 22, which provides good tensile strength and reduces stretching of the chain. Each pair of knuckles 32, 34 defines a cylindrical hole 33 for receiving the pin 18 with a press fit.

Figure 2:
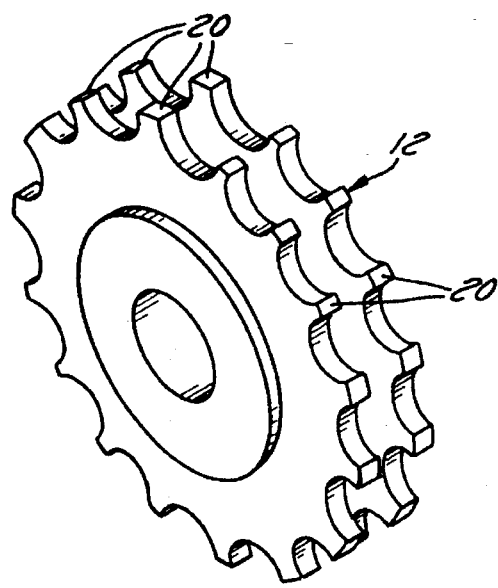
FIG. 2 is a perspective view of the sprocket of FIG. 1.
Figure 3:
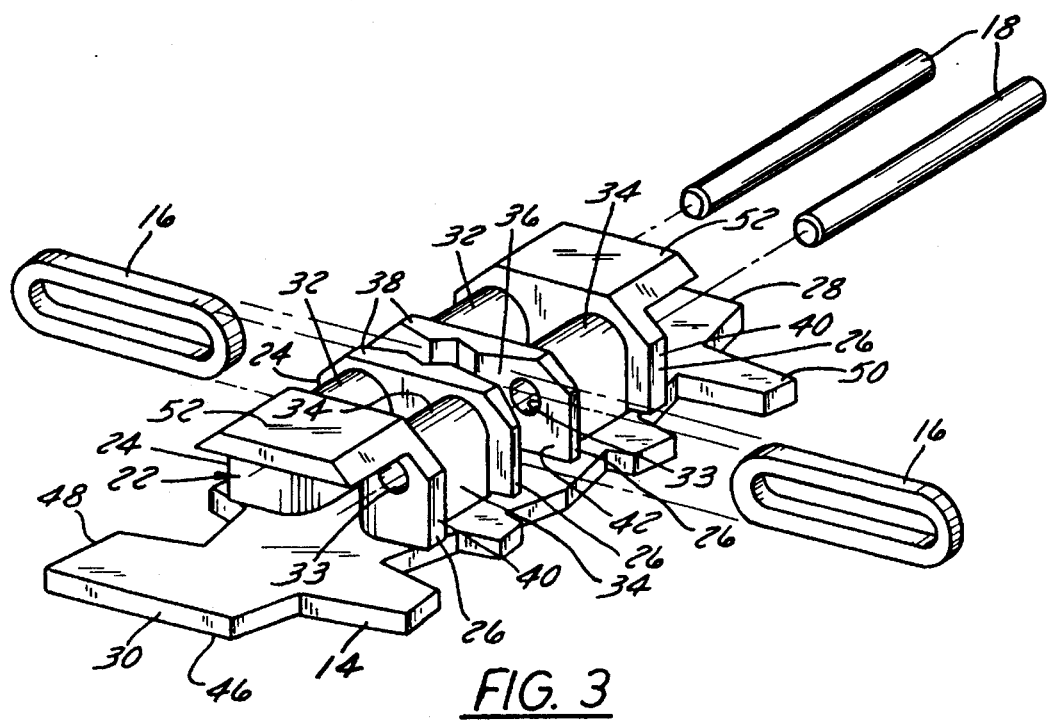
FIG. 3 is an exploded bottom perspective view of a portion of the chain from FIG. 1.
Figure 6:
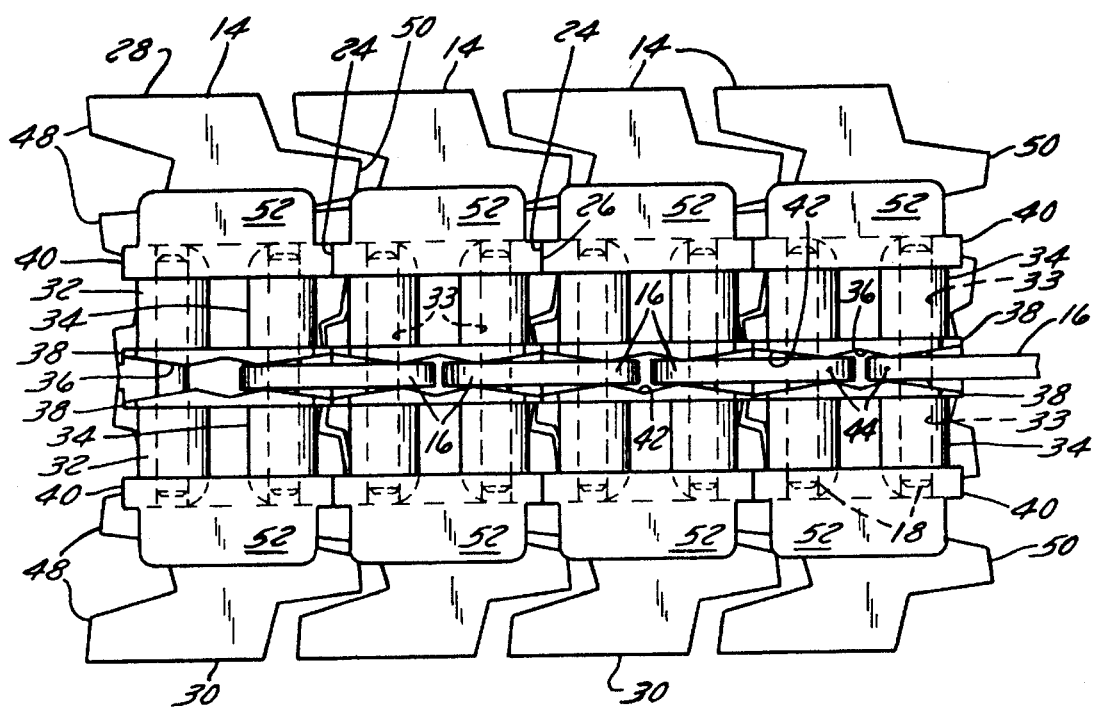
FIG. 6 is the same view as FIG. 4, but with the chain collapsed on itself, as might occur if the chain stretched.
Figure 4:
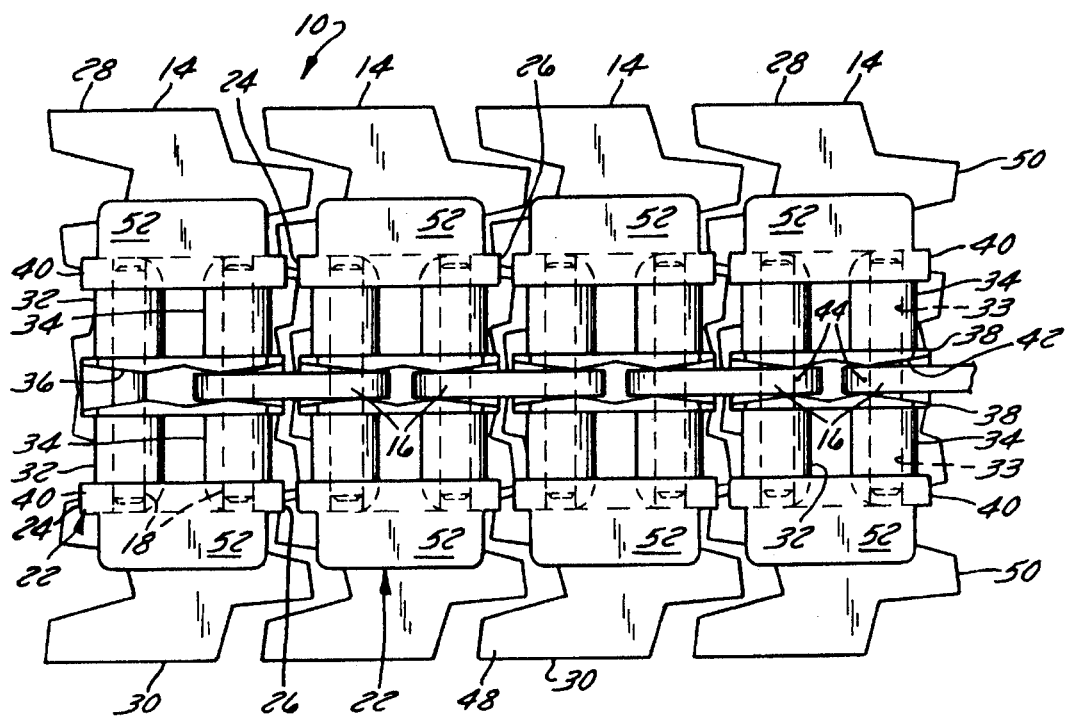
FIG. 4 is a bottom view of the chain which is used in the conveyor of FIG. 1.
Figure 5:
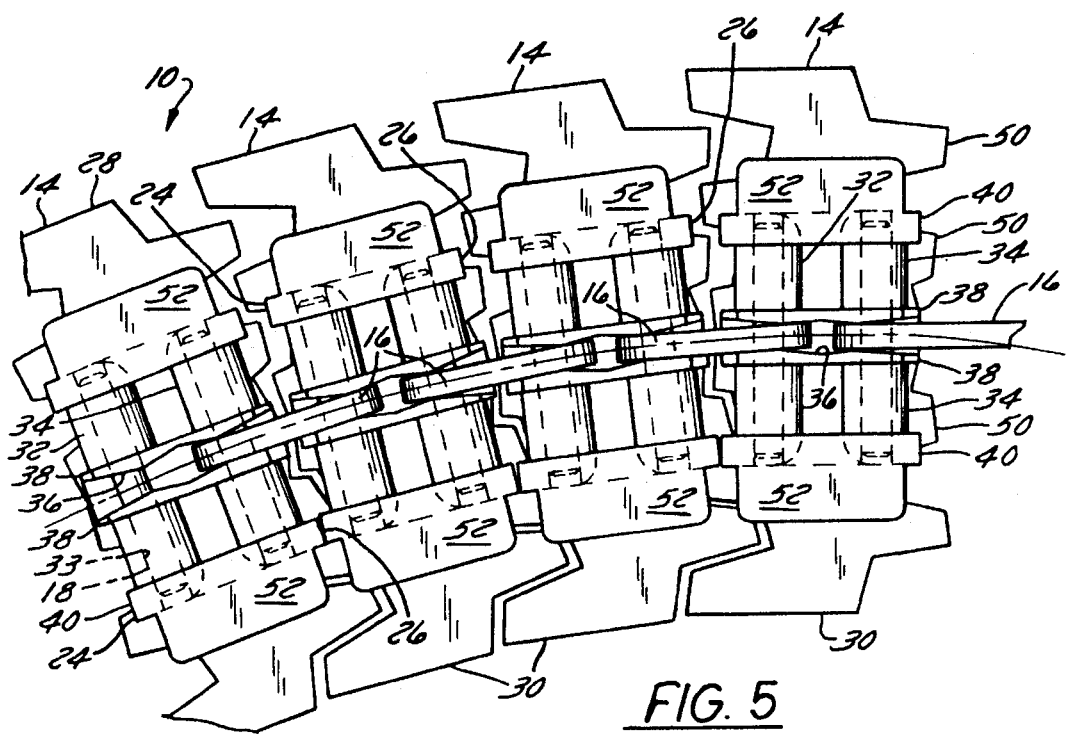
FIG. 5 is a bottom view of the chain of FIG. 4, showing the chain flexing to the side.

The sprocket 12, shown in FIG. 2, is a double sprocket, with aligned left and right teeth 20. For driving the chain, if the first pair of sprocket teeth 20 drives against the left and right forward knuckles 32 of one carrier link 14, then the next pair of sprocket teeth 20 drives against the left and right rear knuckles 34 of the same carrier link 14. The next pair of teeth 20 drives against the forward knuckles 32 of the next carrier link 14, and so forth, so that each carrier link is contacted by two different pairs of teeth 20 in two different radial positions as the sprocket 12 rotates.

In the preferred embodiment, the carrier links 14 are made of plastic, and the connector links 16 are made of metal. This reduces stretching of the chain, because the connector links 16 are made of metal, which does not stretch easily, and the pins 18 are embedded in knuckles 32, 34, which are supported by the inner and outer plates 38, 40, again reducing the opportunity for stretching.

The inner surfaces 42 of the inner plates 38 are contoured to define a pivot point 44 about which the links pivot for side-flexing of the chain 10. The pivot point 44 is at the contact point between the metal pin 18 and the metal connector link 16. The pivoting action is much less likely to cause wear than does the sliding action of many prior art side-flexing chains. Also, there is no sliding against the carrier link 14 during side flexing, so the plastic carrier link 14 should not wear due to side flexing of the chain.

In the event that the chain 10 does stretch slightly during operation, the design shown in this embodiment permits the links to collapse slightly, to take up any slack in the chain. In normal operation, when the chain is in tension, the links take the position shown in FIG. 4, with a gap between the plates 38, 40 of adjacent links, which provides room for side flexing. If the links collapse on each other, they will take the position shown in FIG. 6, with the front and rear edges 24, 26 of the respective inner and outer plates 38, 40 abutting each other. Since the ends of the plates 38, 40 are square and are aligned, when they abut each other, they make the chain rigid and able to be pushed, without becoming skewed and jamming.

The top 46 of the carrier link 14 is flat for carrying articles. The top 46 shown in this embodiment is integral with the link body 22, but it would also be possible for the top to be a separate piece which is attached to the link body 22 or for another attachment to be added to the integral top 46. In this embodiment, the top 46 has forward teeth 48 and rear teeth 50. The forward teeth 48 of one carrier link 16 mesh with the rear teeth 50 of the next carrier link 16. The forward and rear teeth 48, 50 mesh with a loose enough fit to permit sideflexing of the chain 10.

Figure 7B:
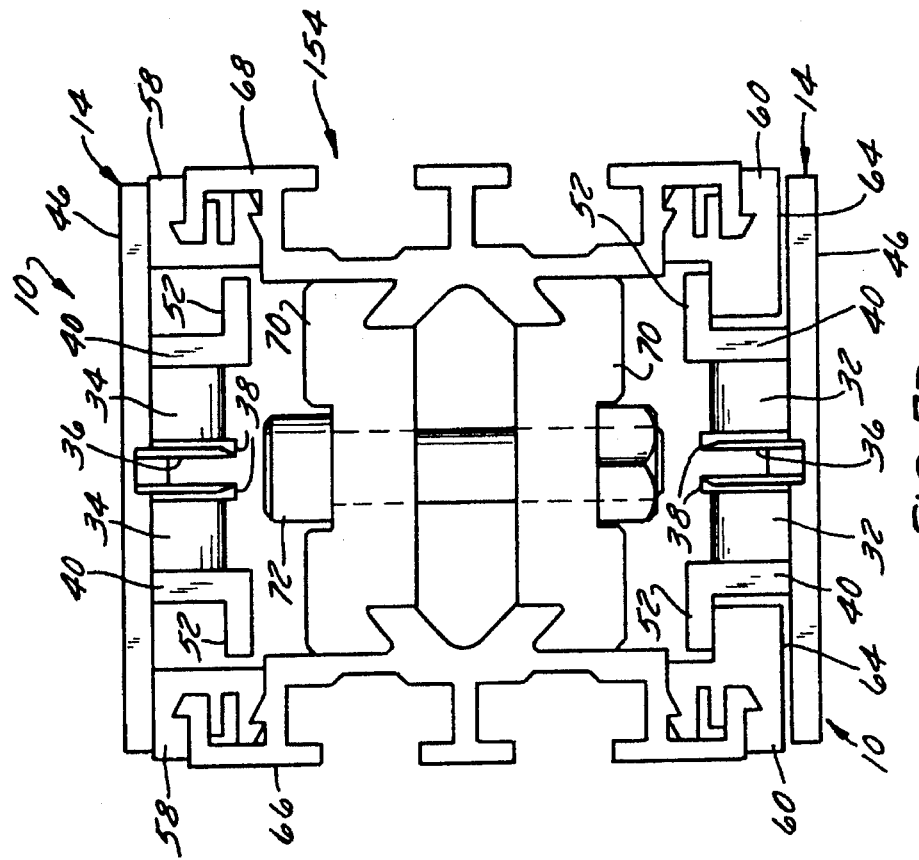
FIG. 7B is the same view as FIG. 7A, but showing a second embodiment of the frame.
Figure 7A:
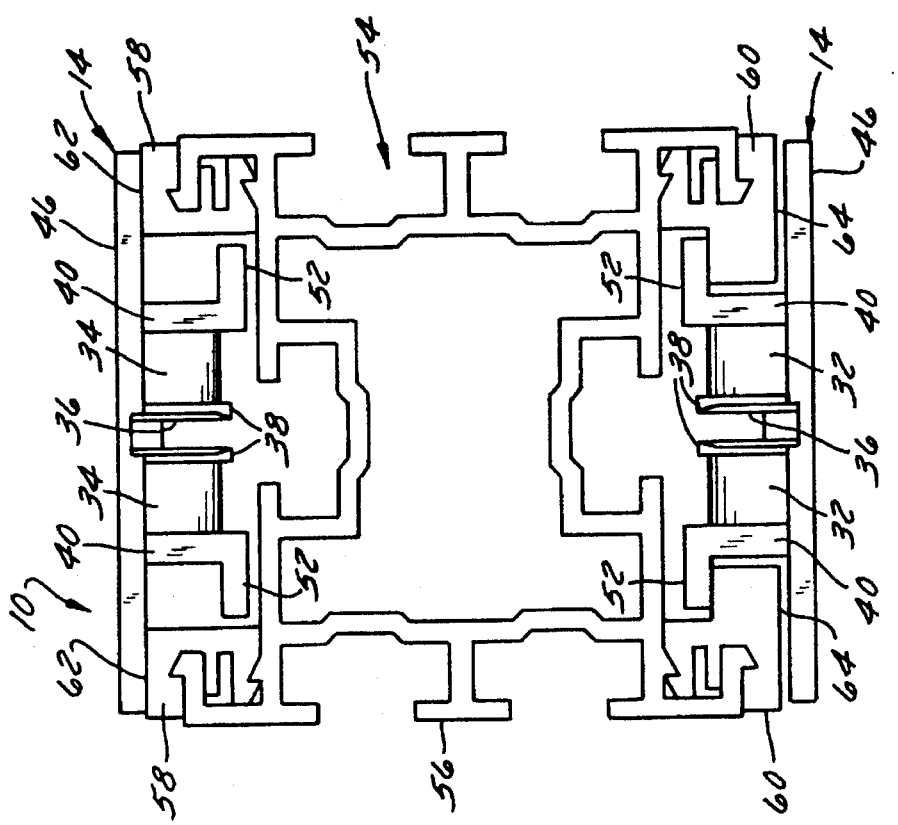
FIG. 7A is an end view of the conveyor frame of FIG. 1, with the drive removed for clarity.
Figure 7C:
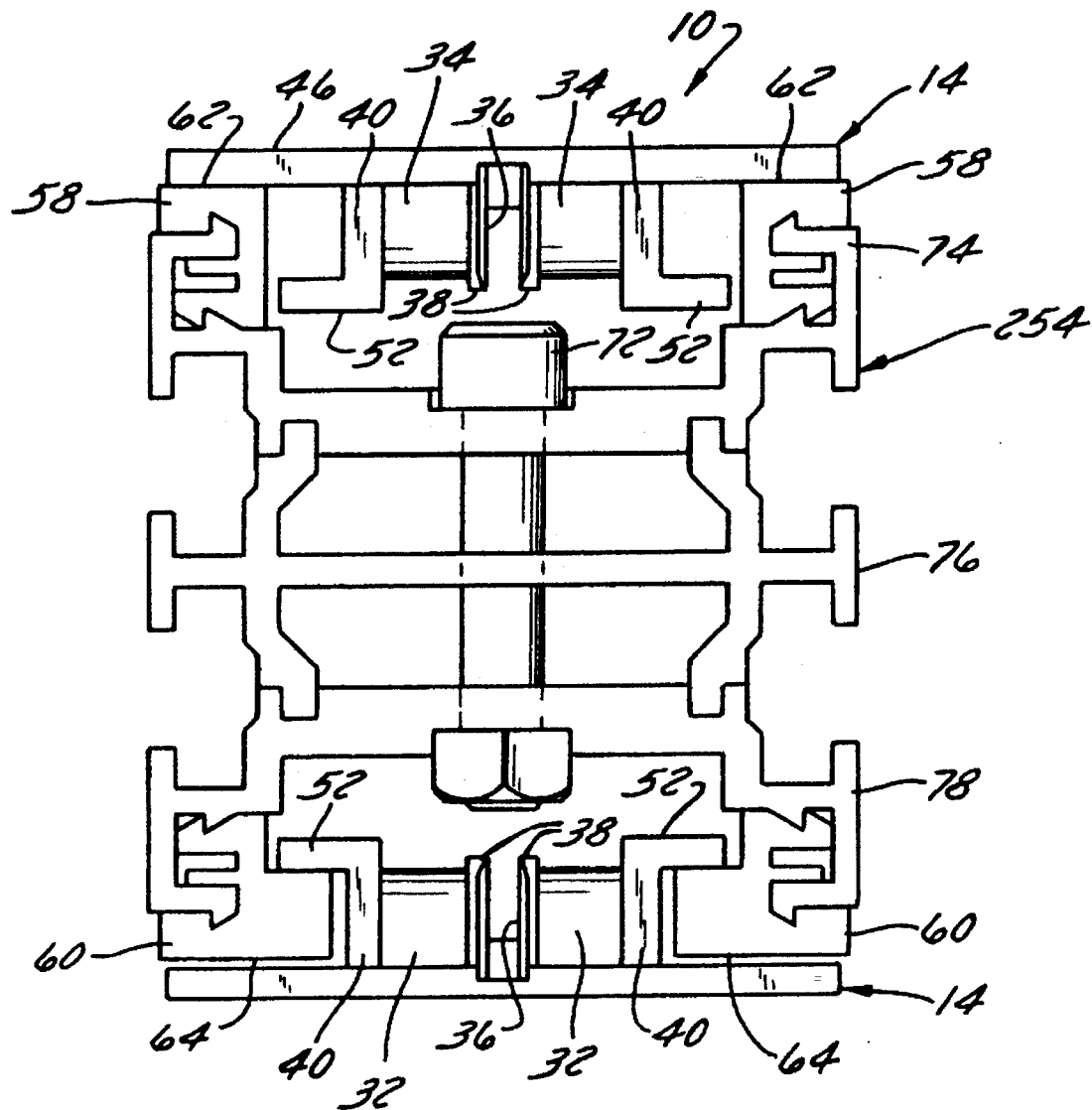
FIG. 7C is the same view as FIG. 7A, but showing a third embodiment of the frame.

The outer plates 40 of the carrier links 14 include horizontally-projecting wings 52, which are used to retain the chain 10 on the frame. FIGS. 7A, 7B, and 7C show three types of frames which can be used to support the chain 10. The frame 54 of FIG. 7A is a single piece 56, which is preferably an aluminum extrusion, with two upper attachments 58 and two lower attachments 60. The attachments 58, 60 are made of a flexible, low-friction material. The upper attachments 58 snap over the top of the frame 54 and provide a flat upper surface 62 on which the upper run of the chain 10 is supported. The low friction material permits the chain to slide easily along the flat upper surfaces 62. The lower attachments 60 snap onto the lower portion of the single piece 56 and provide projections 64 which support the wings 52 of the chain 10 on the lower run.

The frame 154 shown in FIG. 7B functions the same way as that shown in FIG. 7A, but it is made up of left and right extrusions 66, 68, which are fastened together by brackets 70 and bolts 72.

The frame 254 shown in FIG. 7C functions the same way as the frame shown in FIG. 7A, but it is made up of three extruded members 74, 76, 78, which are bolted together.

The advantage of these frames 54, 154, 254 over the prior art is that they permit the chain 10 to be lifted straight up in the upper run, while still retaining the chain in the lower run. It is advantageous to be able to lift the chain straight up out of the frame in order to clean below it, in the event that debris gets into the frame.

Figure 8:
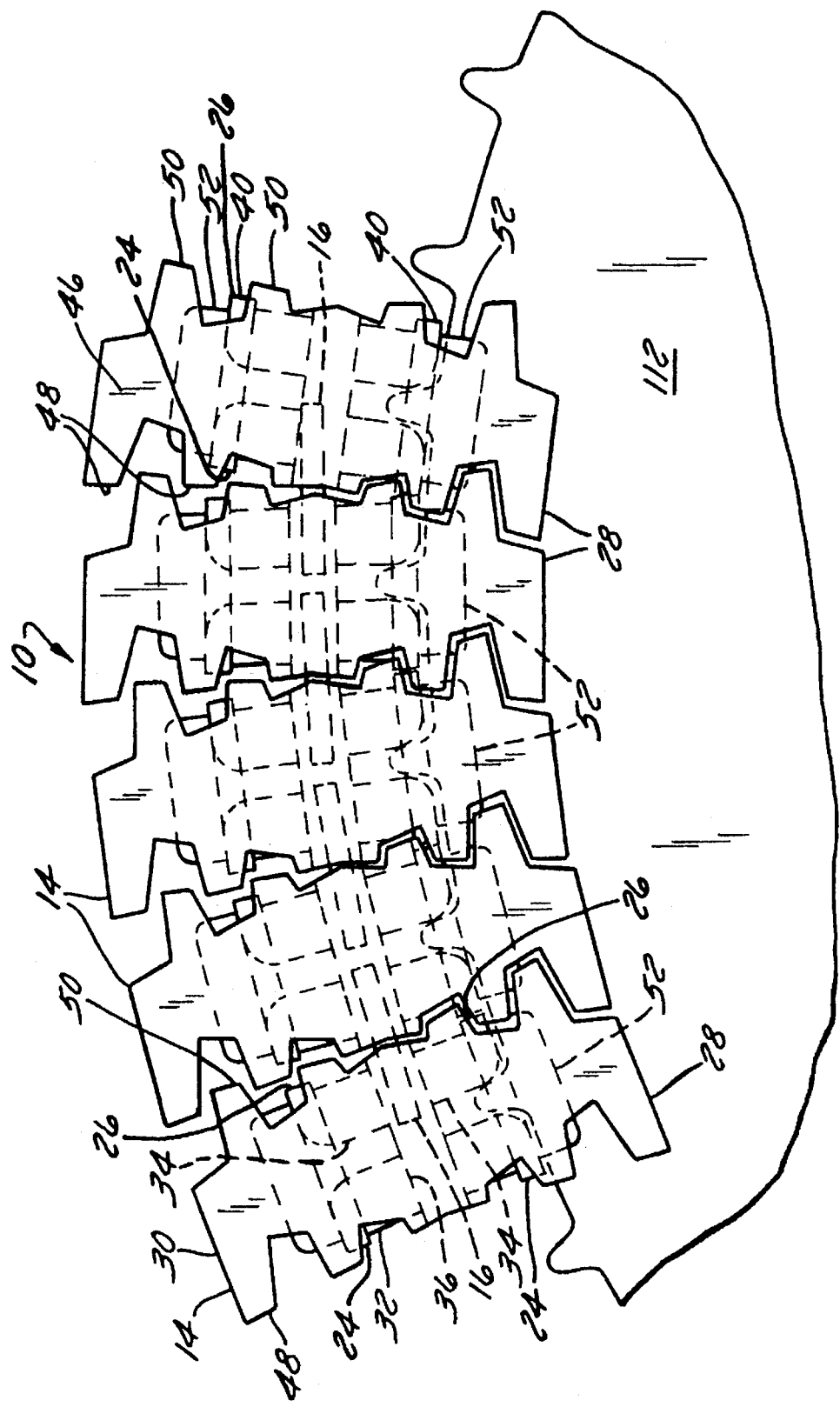
FIG. 8 is a top view of the chain of FIG. 4 being driven from the side.

FIG. 8 shows the chain 10 of FIGS. 1–6 being driven by a sprocket 112 from the side. The forward knuckles 32 and the rear knuckles 34 of the carrier links 14 are contoured at their left and right ends to form a tooth-receiving surface, so that this chain 10 can also be driven from either side. When this chain 10 is driven from the side, there is only one drive contact point per carrier link 14, but, due to the fact that side drive sprockets are usually larger, there is not a problem of cordal pitch when driving from the side.

Figure 9:
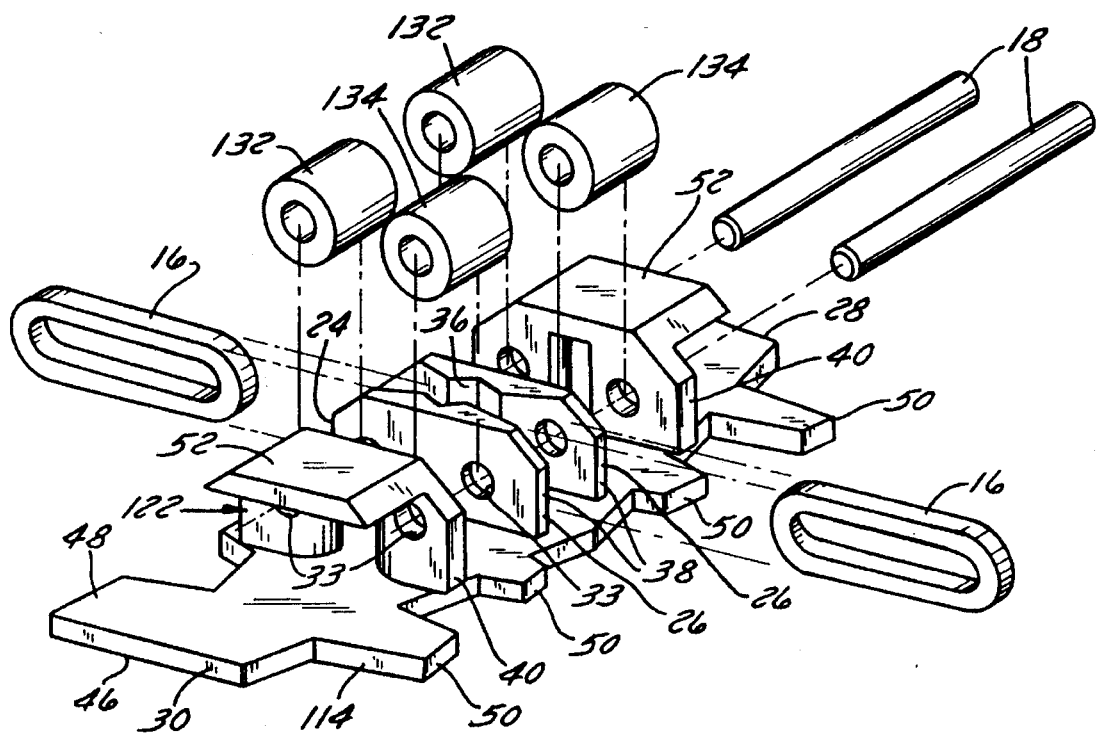
FIG. 9 is a bottom exploded perspective view of a second embodiment of the chain.

FIG. 9 shows a modification of the chain shown in FIGS. 3–6. In this second embodiment of the chain, everything is the same as in the first embodiment, except the forward and rear knuckles 132, 134 are rollers, which are separate from the link body 122. As with the knuckles of the first embodiment, these knuckles 132, 134 are supported by inner and outer plates 38, 40, which distribute the forces in the link body 122. These roller-type knuckles 132, 134 also provide surfaces against which the sprocket teeth drive in order to drive the chain. This type of chain may be supported by a frame which is somewhat different from the frames shown in FIGS. 7A–C. Instead of the top of the chain sliding on a wear strip 62, the frame (not shown) would provide rails on which the roller-type knuckles 132, 134 could roll, thereby reducing friction.

It will be obvious to those skilled in the art that modifications may be made to the embodiments described above without departing from the scope of the present invention.

What is claimed is:

1. A conveyor chain, comprising:

a plurality of alternating carrier links and connector links;

each of said carrier links comprising a link body, defining a forward portion, a rear portion, and left and right sides;

a forward knuckle and a rear knuckle on said link body;

each of said knuckles defining a hole for receiving a chain pin;

each of said connector links being received by the forward portion of one carrier link and by the rear portion of another carrier link; and a plurality of pins holding said respective carrier and connector links together to form a chain;

wherein each of said carrier links in the assembled chain provides a forward drive surface and a rear drive surface for receiving sprocket teeth to drive the chain from below the chain.

2. A chain as recited in claim 1, wherein said link body includes a pair of forward knuckles and a pair of rear knuckles, and each of said pairs of knuckles defines a slot for receiving its respective connector link;

each of said connector links being received in the slot of the rear pair of knuckles of one carrier link and in the slot of the forward pair of knuckles of another carrier link.

3. A chain as recited in claim 1, wherein each of said knuckles is supported by inner and outer plates which are integral with the link body, so as to provide good distribution of forces from the knuckles into the link body.

4. A chain as recited in claim 3, wherein said knuckles are integral with the link body.

5. A chain as recited in claim 3, wherein said knuckles are rollers, which are separate from the link body.

6. A chain as recited in claim 1, wherein said forward and rear knuckles further define a contoured surface for receiving a sprocket tooth from the side, so that said chain can also be driven from the side.

7. A chain as recited in claim 3, wherein said carrier links are made of plastic and said connector links and pins are made of metal so as to reduce the amount of stretch in the chain when the chain is in tension.

8. A chain as recited in claim 2, wherein said slots between said pairs of knuckles have contoured sides so as to define a pivot point between the carrier link and the connector link at the contact point between the connector link and the pin which connects the connector link to the carrier link.

9. A chain as recited in claim 8, wherein said pin and said connector link are made of metal, so the pivoting takes place at a metal-metal contact point, thereby reducing the wear on the carrier link.

10. A chain, comprising:

a plurality of links, each link defining a link body and forward and rear holes for receiving a chain pin;

a plurality of chain pins connecting said links together to form a chain;

said links defining left and right forward abutment members and left and right rear abutment members integral with said link body and fixed relative to each other, such that, when said chain is in tension, said abutment members do not contact each other, and said chain can flex to the side to go around horizontal turns, and, when said chain is in compression, said abutment members abut each other so as to make the chain rigid in the horizontal plane so that it can be pushed.

* * * * *